United States Patent Office 3,371,535
Patented Mar. 5, 1968

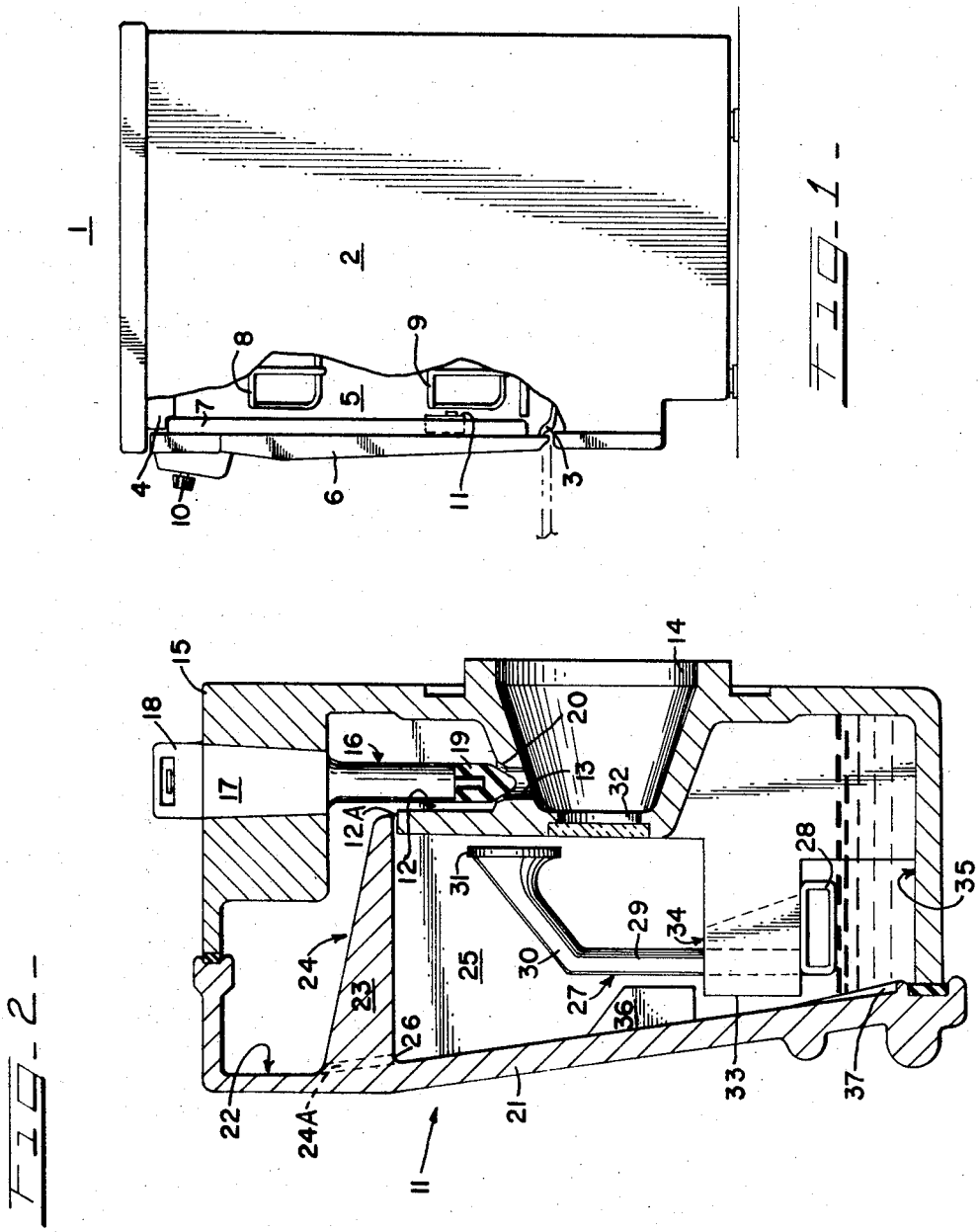

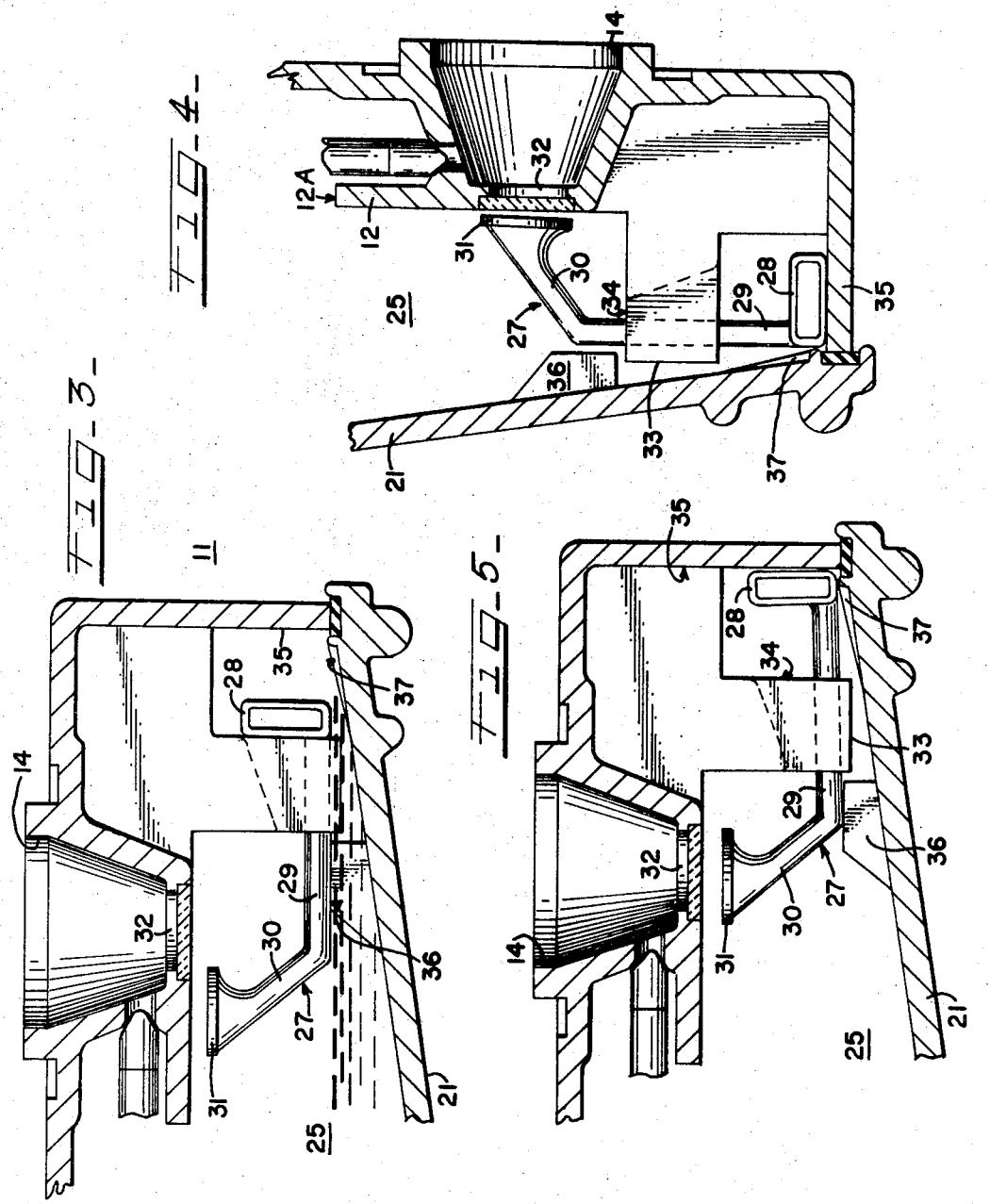

3,371,535
LIQUID LEVEL INDICATOR FOR DISPENSER
IN DISHWASHER DOOR
Leonard J. Martiniak, Waukesha, Wis., assignor to General Electric Company, a corporation of New York
Filed Jan. 7, 1966, Ser. No. 519,219
5 Claims. (Cl. 73—306)

This invention relates generally to an indicator means and, more specifically, to a means to indicate when a liquid reservoir has become empty.

The present invention is particularly adapted for use in an automatic washing machine such as, for example, an automatic dishwasher. It has become quite common to provide an automatic washing machine with a treating agent dispensing means to automatically dispense a treating agent at a predetermined time, or times, during a wash cycle. An example of such a treating agent dispensing means would be a rinse aid injector in an automatic dishwasher. The rinse aid is injected automatically during the initial portion of the final rinse step of the wash cycle. The rinse aid is actually a wetting agent which causes the rinse water to contact the dishes in a "sheet" fashion rather than in a droplet fashion. This "sheeting" action minimizes spotting of the dishes, upon drying, because it minimizes the formation of spot inducing droplets.

The rinse aid injector usually includes a reservoir capable of storing enough rinse aid fluid for several dishwasher cycles of operation to thereby obviate refilling of the injector after each cycle. The injector, including the reservoir, is often positioned within the dishwasher interior door structure, and the condition of the reservoir can only be observed when the door is open. Therefore, it is desirable to provide means readily visible to the operator to indicate when the reservoir has become empty. In addition, because the dispenser is located in the door of the dishwasher, the indicator means must be capable of maintaining its indicating position through a 90° movement from a vertical orientation to a horizontal orientation or vice versa, depending on whether the dishwasher is a "front-opening" or "top-opening" unit.

Accordingly, it is an object of this invention to provide an improved liquid level indicator for a liquid reservoir.

It is a further object of this invention to provide an indicator for a dishwasher which is economical to make, requires a minimum of parts, and is easily viewed by the operator when the dishwasher door is in the open position.

It is yet a further object of this invention to provide an improved liquid level indicator which is capable of being tipped 90° about a horizontal axis without impairing its operation, and which therefore may be used in dishwashers of either the "front-opening" or "top-opening" construction.

In one aspect of my invention, I provide a dishwasher having a wash chamber and a door pivoted about a horizontal axis for movement between open and closed positions relative to the chamber. Located on the inner panel of the door is a dispensing means for dispensing liquid into the wash chamber at a desired time during the washing operation. The dispenser includes a container having a reservoir portion and a transparent window located in a wall of the container adjacent the reservoir portion, whereby an operator may look into the reservoir when the door is in an open position. Disposed within the reservoir is an indicating means for indicating the amount of liquid remaining therein. The indicating means comprises an elongated member having a flag at one end thereof and a float at the opposite end thereof, the indicating means thereby being adapted to float on the surface of liquid which may be in the reservoir. The indicating means follows the level of liquid within the reservoir from a first position wherein the reservoir if full and the flag means is out of alignment with the viewing window. The indicating means then passes through a series of intermediate positions in which the level of liquid within the reservoir decreases and the flag means begins to appear behind the window. A final position is then reached wherein the indicating means rests on a wall of the container when the reservoir is empty, with the flag means then being positioned directly behind the window and viewable from outside the container when the door is open. Also disposed within the reservoir are guide means for retaining the indicating means and the flag means in substantially the same position relative to the window while the door is in either the open or closed positions.

While the specification concludes with claims particularly pointing out and distinctly claiming the subject matter which is regarded as my invention, it is believed my invention will be better understood from the following description, taken in connection with the accompanying drawings, in which:

FIGURE 1 is a side view, partially cut away to show details, of an automatic dishwashing machine of the "front-opening" type employing the present invention;

FIGURE 2 is an enlarged side sectional view of the rinse aid dispenser of the dishwasher of FIGURE 1, showing the indicator in a position when the reservoir is partially full of liquid and the door is in the closed position;

FIGURE 3 is an enlarged sectional view showing the indicator means when the dishwasher door is in the open position and the reservoir contains the same amount of liquid as in FIGURE 2; and FIGURES 4 and 5 are views similar to FIGURES 2 and 3 respectively, and show the indicator means in a final position when the reservoir is empty and the door is in the closed and open positions resepectively.

Referring now to the drawings, and more particularly to FIGURE 1, there is illustrated an automatic dishwashing machine in the form of a conventional "front-opening" type. Briefly, dishwasher 1 comprises an outer cabinet 2 which, in cooperation with a bottom wall 3 and a top wall 4, forms a wash chamber 5. Chamber 5 is provided with a bottom-hinged door 6 which is swingable between a substantially vertical closed position and an open position in which the inner panel 7 of the door is substantially horizontal, as partly shown by the dashed lines in FIGURE 1. In addition, door 6 may have suitable vents therethrough (not shown) to permit hot air to escape from chamber 5.

Within chamber 5 there are a pair of vertically spaced racks 8 and 9 adapted to receive dishes for washing. When door 6 is closed, the racks are in the positions shown, but when the door is open, the racks may roll forward in a manner well known in the art to a position wherein they are readily accessible to an operator for loading and unloading operations. Within the dishwasher, there is an appropriate pumping system (not shown) for recirculating water within chamber 5 so as to effect washing of dishes during washing operations, and for removal of water subsequent to each washing or rinsing operation.

It will be understood that the rack structure, the front door structure, and the washing system may be of any type well known in the art. For instance, one such system is shown in my prior U.S. Patent No. 3,213,866, issued Oct. 26, 1965, for Dishwashing Apparatus With Conical Spray Device Means, and assigned to the same assignee as the present application.

The operation of the dishwasher may be initiated by the operator by the use of a manually operable member 10. Then, as is conventional in the art, an appropriate series of washing, rinsing, and drying operations will be provided under the control of a conventional timer device (not shown) and thereafter operation will terminate.

Attached to inner panel 7, and facing wash chamber 5, is a treating agent dispensing means indicated generally by the numeral 11. At a suitable time in the final rinse cycle, a small amount of wetting agent is added to the rinse water by dispenser 11 to eliminate spotting of the dishes.

All of the structure thus far described is, in most respects, conventional and may therefore vary a great deal without materially affecting the present invention. The present invention is, as mentioned earlier, not limited in utility to application in a dishwasher, a dishwasher being shown and described for purposes of illustration only.

The construction of one treating agent dispensing means 11 for which my indicating means is suitable may be in accordance with the description by Fink et al., found in Patent No. 3,029,826, issued Apr. 17, 1962, and assigned to the same assignee as the present application. The detailed construction of the dispensing means, beyond its comprising a reservoir is not, however, critical to the present invention.

As shown in FIGURE 1, the dispenser 11 comprises a generally rectangular container arranged to be mounted within the dishwasher door 6; that is to say, between the inner and outer panels comprising the door. The dispenser may be mounted to inner panel 7 by suitable means such as by screws (not shown) entering holes in the front wall of the dispenser.

As best shown in FIGURE 2, the dispenser advantageously comprises a two-part structure, molded from a suitable plastic material, such as a phenol-formaldehyde condensation product. The main body part includes a fill opening and cap therefor, neither of which is shown; the measuring cup 12, formed with a passage 13 leading to the exit port 14; and a guide 15 for the valve 16. The valve 16 has an enlarged stem portion 17 which terminates in an apertured extension 18. At its inner end, the valve is equipped with a suitable tip 19 which is arranged to seat in a conical aperture 20 at the base of the measuring cup. Advantageously, the tip 19 is of a compressible material such as a suitable silicone rubber composition.

The wall 21 of the dispenser is so designed that it slopes toward a sump 22 when the door is in its opened position, as shown in FIGURE 3. The wall 21 has wall means 23 extending therefrom which defines a conduit structure 24 leading to cup 12, as seen in FIGURE 2. An access passage 24A is provided in wall 23 through which the liquid content of the dispenser will enter the sump 22 and then into the conduit 24 from a main reservoir portion 25, when the door is open. When the door is raised to the closed position, the liquid will spill from the conduit ot the measuring cup 12. Thus the liquid can enter the cup 12 only by way of the conduit 24. When the container is "full," any excess of liquid entering cup 12 will overflow the rim 12A of the cup and return to reservoir 25. The sump 22 is positioned so that so long as there is sufficient liquid in reservoir 25 to reach the point 26 of the reservoir, the conduit 24 will contain enough liquid to fill the cup 12 to its capacity as represented, of course, by the annular space around the valve stem.

The manner in which the valve operates during the cycles of the dishwasher to discharge liquid from the dispenser is not critical to the present invention, and therefore will not be described in detail. Reference is made once again to the Fink et al. patent which fully explains the operation of the particular dispensing means heretofore described.

In accordance with the present invention, a liquid level indicating means, shown generally at 27, is provided to indicate when reservoir 25 has become empty. Indicating means 27 is designed to float on the surface of liquid in the reservoir, and may be made of a suitable plastic material like polypropylene. Indicating means 27 is lightweight, on the order of one gram.

Indicating means 27 comprises an L-shaped member having a lower transverse leg portion 28 and an elongated central portion 29. Leg 28 is hollow to provide added buoyancy and serves as a float means for indicating means 27. At the upper end of central portion 29 is a finger portion 30 which extends obliquely from central portion 29 towards the discharge side of the dispenser. Finger portion 30 terminates in a flag means 31, which is substantially parallel to a transparent viewing window 32 positioned at the base of discharge port 14. Window 32 in turn is substantially parallel to the inner panel 7 of door 6.

As most clearly illustrated in FIGURE 4, the length of the indicating means 27 and the height of the transparent window 32 above wall 35 are of a relationship such that in the absence of any liquid in reservoir 25, flag means 31 will be positioned directly behind the window. In this respect, the flag means is desirably of a bright red color so that it will be readily visible under the adverse lighting conditions often prevailing.

Inasmuch as door 6 is to be pivoted through a 90° arc, suitable guide means are provided within the reservoir proper which maintain indicating means 27 in alignment with window 32, even though the reservoir may be empty. To restrain movement of the indicating means transversely of the viewing window 32, two fingers 33 (one only being shown) provide a channel 34 which permits vertical movement of indicating means 27 between the wall 35 of dispenser 11 and the bottom of finger 33 as seen in FIGURES 2 and 4. The transversely extending float means 28 thus permits only limited vertical movement of indicating means 27, as seen in FIGURE 2.

Because the wall 21 of the dispenser is sloped towards sump portion 22, suitable support means, 36 and 37, are provided to maintain central portion 29 and flag 31 substantially parallel to window 32 at all times, regardless of the location of indicating means 27.

The position of the indicating means when the reservoir is partially full of liquid is shown in FIGURES 2 and 3. In FIGURE 2, it will be observed that because of its buoyant nature, the indicating means is positioned at the maximum vertical elevation permitted by fingers 33. While in this position, flag 31 is not located behind window 32, and therefore is not visible therethrough. When door 6 is rotated to the horizontal open position, the dispenser will be in the position shown in FIGURE 3. Because the liquid tends to flow towards the low point 26 of the reservoir, the float 28 of the indicating means will continue to abut fingers 33, and as the door is opened, the central portion 29 by gravity, will rest on support member 36. Gravity and liquid adhesion will then continue to hold the flag in the position taken when tipping action was started, so that flag 31 would still not be visible through window 32. If the dishwasher is of the "top-opening" type, then the FIGURE 2 position would be illustrative of the location of the indicating means when the top is raised to a vertical open position so that the operator may view window 32.

Of course, as the amount of liquid continues to decrease, indicating means 27 will likewise drop vertically as shown in FIGURE 4, and approach the wall 35, which may be denoted as the base of the dispenser when the door is in the vertical position. Correspondingly, flag 31 will likewise descend and begin to appear behind window 32.

The location of the indicator when the reservoir is completely empty is illustrated in FIGURES 4 and 5. When the door is in the vertical closed position, the float member 28 of indicating means 27 will rest on the base 35 of reservoir 25, as shown in FIGURE 4, thus positioning the flag directly behind window 32. When the door is rotated through a 90° arc to the horizontal open position illustrated in FIGURE 5, the indicator 27 will rest on support means 36 and 37, so that the flag is maintained parallel to window 31. Of course, if the dishwasher is of the "top-opening" type, then the FIGURE 4 position of the indicator would be illustrative of the door in the vertical open position, with the flag 31 being readily apparent to the operator.

From the foregoing, it is apparent that I have provided an improved liquid level indicator for a dispensing means in a dishwasher door. In my present arrangement, the indicator may be used in a dishwasher of either the "front-opening" or "top-opening" type, and is not affected by the rotation of the door from the open to closed positions or vice versa.

While there has been described what is at present thought to be the preferred embodiment of the invention, it will be understood that various modifications may be made therein, and it is intended to cover in the appended claims all such modifications as fall within the true spirit and scope of the invention.

I claim:

1. In a water-using appliance having a wash chamber and a door pivoted about a horizontal axis for movement between open and closed positions relative to said chamber, said door including dispenser means for dispensing liquid into said wash chamber at a desired time, said dispenser including:
   (a) a container having a reservoir portion;
   (b) a transparent window positioned within a wall of said container adjacent said reservoir portion for viewing into said reservoir when said door is in an open position;
   (c) indicating means disposed within said reservoir for indicating the amount of liquid present therein;
   (d) said indicating means comprising an elongated member having flag means at one end thereof and float means at the opposite end thereof, said indicating means thereby being adapted to float on the surface of liquid within said reservoir;
   (e) said indicating means floating on the surface of liquid within said reservoir between a first position in which said reservoir is full and said flag means is not aligned with said window and is not viewable therethrough, through a series of intermediate positions in which the level of liquid within said reservoir decreases and said flag means begins to appear behind said window, and a final position wherein said indicating means rests on a wall of said container when said reservoir is empty, with said flag means being positioned directly behind said window and viewable from outside said container; and
   (f) guide means disposed within said reservoir for retaining said indicating means and said flag means in substantially the same position relative to said window while said door is in either the open or closed position.

2. In combination with a dishwasher having a wash chamber therein:
   (a) a door for said wash chamber pivoted about a bottom transverse side for movement of said door between a vertical closed position and a horizontal open position;
   (b) a dispenser for liquid to be introduced into said chamber at a desired time, said dispenser including;
      (i) a container affixed to the inside of said door and including discharge structure communicating with the interior of said chamber when said door is in closed position;
      (ii) a reservoir portion within said container and disposed adjacent said discharge structure; and
      (iii) a transparent window positioned in a wall of said container between said discharge structure and said reservoir portion for viewing into said reservoir when said door is in the horizontal open position;
   (c) indicating means disposed within said reservoir for indicating the amount of liquid present therein, said indicating means comprising:
      (i) an elongated central member having flag means at one end thereof and float means extending transversely therefrom at the opposite end thereof;
      (ii) said indicating means being formed to float on the surface level of liquid in said reservoir between a first position, in which said flag means is not visible through said window when said reservoir is full, through a series of intermediate positions in which the level of liquid within said reservoir decreases and said flag means begins to appear behind said window, and a final position in which said float means rests on the base of said reservoir when said door is in the vertical closed position and said reservoir is empty;
      (iii) the relationship of said transparent window relative to the base of said dispenser and said flag means being such that said flag means will be positioned behind said window when said reservoir is empty and said float means rests on the base portion of said reservoir; and
   (d) guide means disposed within said reservoir for retaining said flag means in substantially the same position relative to said window while said door is rotated between the vertical closed position and the horizontal open position.

3. The combination according to claim 2 wherein said guide means comprises a pair of finger means extending from one wall of said reservoir portion about said elongated central portion of said indicating means, said finger means forming a channel restraining said indicating means to a vertical component of movement relative to said window when said door is in the vertical closed position, and said float means of said indicating means extends transversely past at least one of said fingers to engage therewith to thereby limit the upward extent of vertical movement of said indicating means.

4. The combination according to claim 3 further including support means disposed within said reservoir opposite said window, said support means being positioned below said indicating means for supporting said indicating means with said flag substantially parallel to said window when said door is in the horizontal open position and said reservoir is partially full.

5. The combination according to claim 3 wherein the wall of said reservoir opposite said wall containing said window is sloped outwardly and away from said window and said base; said outwardly sloping wall forming a low point in said reservoir when said door is in the horizontal open position, whereupon liquid present in said reservoir will flow toward said low point and away from said base, and said indicating means will thereupon follow said flow of liquid away from said base whereby said flag means will be out of alignment with said window when said door is in the horizontal open position and there is liquid in said reservoir; said float means of said indicating means engaging one of said fingers to limit the horizontal extent of movement of said indicating means; and said sloping wall being formed to maintain said indicating means and said flag means substantially parallel to said window when said door is in the horizontal open position and said reservoir is partially full.

References Cited

UNITED STATES PATENTS

| | | | |
|---|---|---|---|
| 1,332,276 | 3/1920 | Weaver | 73—306 |
| 3,029,826 | 4/1962 | Fink et al. | 222—54 X |
| 3,187,954 | 6/1965 | Hammer et al. | 221—51 X |

LOUIS R. PRINCE, *Primary Examiner.*

DANIEL M. YASICH, *Assistant Examiner.*